April 22, 1952 — LA VERN H. DE HAVEN — 2,593,855
CONCENTRIC FILTER UNIT
Filed March 30, 1946 — 2 SHEETS—SHEET 1

LAVERN H. DEHAVEN
INVENTOR.

April 22, 1952 — LA VERN H. DE HAVEN — 2,593,855
CONCENTRIC FILTER UNIT
Filed March 30, 1946 — 2 SHEETS—SHEET 2
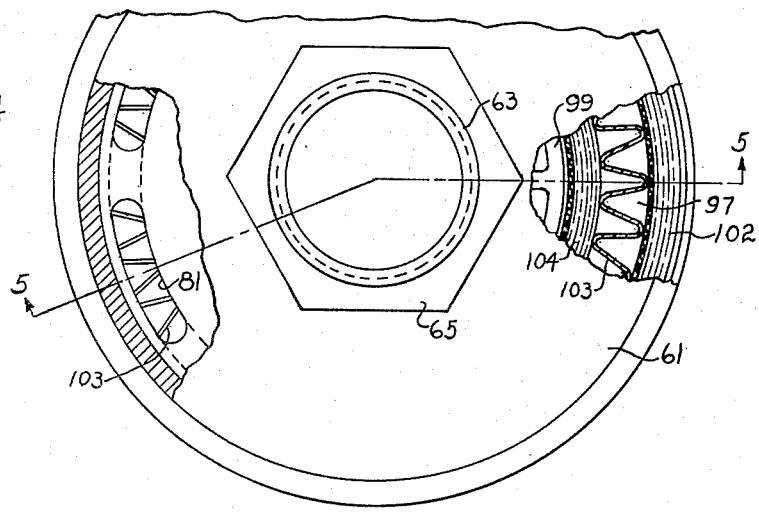
Fig. 4
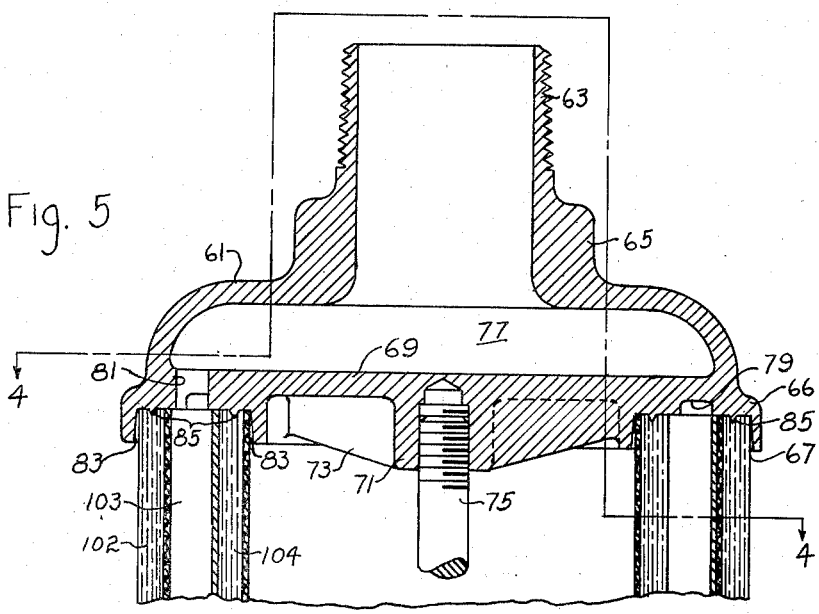
Fig. 5
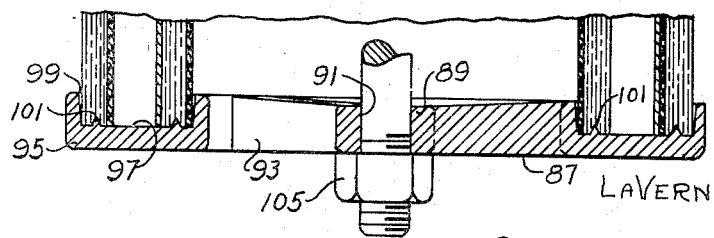
LaVern H. DeHaven
INVENTOR.
BY Edmund W. E. Kamm Patented Apr. 22, 1952

2,593,855

UNITED STATES PATENT OFFICE 2,593,855

CONCENTRIC FILTER UNIT

La Vern H. De Haven, Fort Wayne, Ind., assignor to Bowser, Inc., Fort Wayne, Ind., a corporation of Indiana Application March 30, 1946, Serial No. 658,520

5 Claims. (Cl. 210—170)

This invention relates to filter units. More specifically, it relates to a filter unit which has two concentric filtering elements which are held in spaced relation and in which the filtrate is withdrawn from the annular space between the elements and in which the same annular space serves as a conduit through which backwashing water may be forced to clean the surfaces of the elements.

It is therefore an object of the invention to provide a pair of concentric filtering elements.

Another object of the invention is to provide concentric filtering elements held in spaced relation by a strong separator member.

Yet another object of the invention is to provide an element which can be readily backwashed.

Still another object of the invention is to provide a structure which is easy to assemble and disassemble for cleaning.

Yet another object of the invention is to provide a structure which is efficient and long-lived.

Still another object of the invention is to provide a structure which will precoat evenly with filter aid and to a uniform thickness.

These and other objects of the invention will become apparent from a study of this specification and the drawings which are attached hereto and made a part hereof and in which:

Figure 4 is a plan view similar to Figure 1 of a modified form of unit, utilizing a wound cartridge type of filter element, the broken away parts being sections taken substantially on line 4—4 of Figure 5.

Figure 5 is a sectional view of the modified form, similar to Figure 2, but taken on the line 5—5 of Figure 4.

Figure 1:
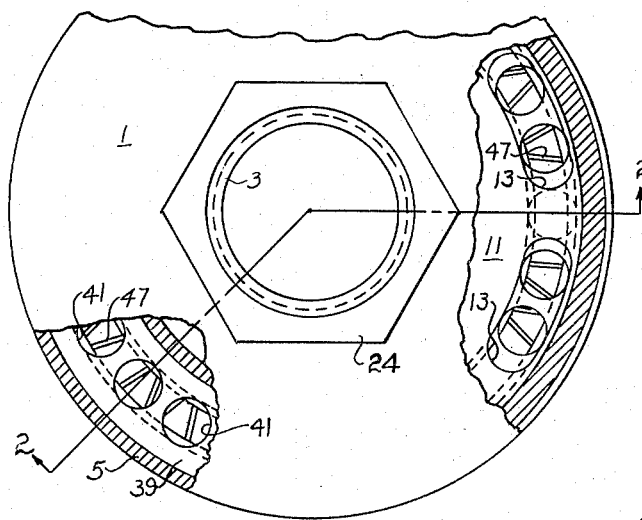
Figure 1 is a plan view of the unit with parts broken away to show the top head structure and the grommet. The broken away parts are taken substantially on the line 1—1 of Figure 2.
Figure 2:
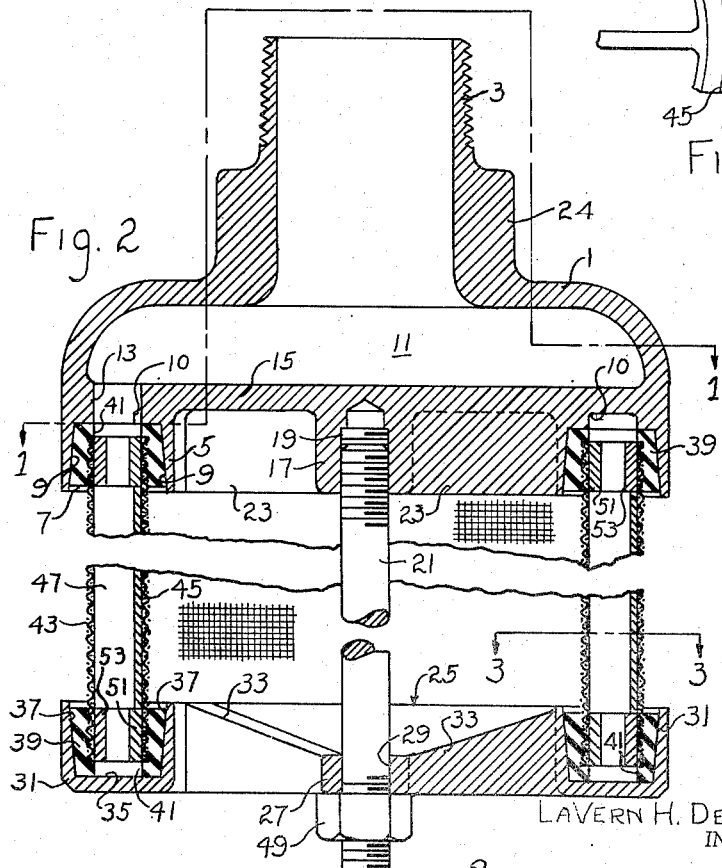
Figure 2 is a view taken substantially on the line 2—2 of Figure 1, showing the filter elements, separators, grommets and heads.
Figure 3:
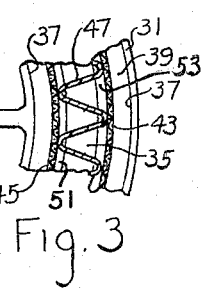
Figure 3 is a partial, sectional view taken substantially on the line 3—3 of Figure 2, showing the separator and filtering elements.

Referring now to Figures 1, 2 and 3, the numeral 1 represents the upper head of the unit which is provided with a hollow, screw threaded stub 3 adapted to enter a deck plate or other support not shown. The lower end of the head bells out and is provided with a wide annular flange 5 which has formed in it, a downwardly facing groove 7. The sides of the groove taper outwardly as at 9 and a channel 10 is formed in the central (upper) wall of the groove.

The head is also provided with a chamber 11 which communicates with the groove 7 by means of elongated ports 13 which are of the same width as the merge in the channel 10. On the lower wall of 15 of the chamber is formed a depending boss 17 which is provided with a blind, threaded hole 19 for the reception of the upper end of a tie rod 21. Webs or spokes 23 which are integral with the wall 15 connect the boss 17 with the inner wall of the flange 5 as shown in Figure 2.

The lower portion 24 of the outlet stub 3 is enlarged and of hexagonal cross-section so as to provide a hold for a wrench.

A lower head 25 comprises a central hub 27 which is perforated at 29 to receive the tie rod and which is connected with an annular rim portion 31 by means of arms 33. The rim is provided with an annular groove 35 similar to groove 7 and the side walls 37 thereof taper downwardly and inwardly.

A grommet 39, U-shaped in cross-section, of rubber or other suitable compressible, resilient material, is seated in the groove 7 in the upper head and a similar grommet 39 is seated in the groove 35 of the lower head. The central wall of the grommet is perforated in numerous places indicated by numeral 41. These openings serve no useful purpose in the lower head, but in the interests of economy, the same grommet is used in both heads. In the upper head the openings 41 establish communication with the ports 13.

A cylindrical outer screen 43 and a smaller, cylindrical inner screen 45 are disposed concentrically and are held in spaced relation by a separator 47 which is formed by bending a sheet of corrugated material, such as metal, into a cylinder. The screens rest on the high portions of the corrugations as is clearly shown in Figure 3. The spaces between the high points thus form vertical filtrate discharge channels.

The ends of the screens are received in the grooves of the grommets and are held in place by a nut 49 on the tie rod 21.

A ring 51 having an internal diameter adapted to snugly receive the inner screen 45, and having a width substantially equal to the depth of the groove in the grommet is passed over each end of the screen 45 in abutting relation with the ends of the separator 47. Similarly, a ring 53 having an external diameter such that the ring will be snugly received inside the exterior screen 43, is inserted at each end of this screen and abuts the separator. The rings 53 and 51 have the same width.

The rings function to support the screens against the exterior pressure on them. If the separators were extended into the region of the grommets, the pressure would tend to corrugate the screens in conformity with the corrugations of the separator and leaks would be produced. By the use of the rings 51 and 53, a proper seal is maintained between the grommets and the screens.

Of course, the screens or filter elements may be of any suitable mesh and materials. Where diatomaceous earth or other filter aid is used as a precoat, the screen must be selected so that it will take a precoat.

Operation

The screens 43 and 45 are assembled on the separator 47, rings 51 and 53 are mounted on the screens and the grommets 39 are installed on the ends of the assembly. The heads are then placed on the grommets, the rod 21 is passed through opening 29 of the lower head and nut 49 is screwed onto the rod to force the grooves 7 and 35 over the grommets. The inclined walls of the grooves compress the sides of the grommet against the screens which are in turn supported by the rings 51 and 53 so that the screens are sealingly engaged and held.

The outlet stub 3 is then mounted in a deck plate or otherwise connected to a filtrate conduit and liquid under pressure is applied to the exterior surfaces of the screens 43 and 45. If a precoat is desired, filter aid is added to the unfiltered liquid and is deposited on the screens as the liquid passes through it.

The liquid flowing through the screens and precoat enters the grooves in the separator 47 and passes between the rings 51, 53, through opening 41 in the upper grommet, channel 10, ports 13 into chamber 11 and out through stub 3.

To backwash the precoat or solids from the exterior surfaces of the screens it is necessary only to reverse the flow just described and discharge filtrate through the screens.

It has been found by actual test that the provision of channels such as formed by the corrugations of the separator 47, each of which has free access to chamber 11, enables the operator to establish an even precoat of uniform depth over the entire surface of each screen and further that the screens will backwash over their entire areas.

Many tests with other types of separators which did not have the channels and free access would not precoat evenly and could not be backwashed.

Modified form

Referring now to Figures 4 and 5, the numeral 61 refers to a top head which is similar to that of Figure 1 in that it has an outlet stub 63, a wrench hold 65, a flange 66 having an annular groove 67, a bottom wall 69, a central boss 71, radial arms 73 connecting the wall, flange and hub, a tie rod 75, a chamber 77, and an annular channel 79 and elongated ports 81 connecting the groove with the channel.

The groove 67 is of less depth than in the preferred form, but it has outwardly tapered side walls 83. A pair of concentric beads 85 which are V-shaped in cross-section are formed on the center wall of the groove and on opposite sides of the channel 79.

The bottom head 87 is similar to that of the preferred form in that it has a central hub 89 which is perforated at 91 to receive the tie rod, has spokes 93 radiating therefrom and connecting to an annular rim 95 which is provided with an annular groove 97 having tapered side walls 99. The groove is similar to groove 67 in the top head and is also provided with two spaced, V-shaped, concentric beads 101.

Two filter elements 102 and 104 are disposed concentrically in the heads and are held in spaced relation by a corrugated separator 103 like the separator 47 of Figure 1, except that in this case the separator extends substantially the full length of the filter elements.

The elements are preferably formed as hollow cylinders of paper or equivalent material impregnated with phenolic resin, lined with thin cloth, and baked. The elements may be those described in the application for patent filed by Frank B. Harvuot, Serial Number 562,191 of November 6, 1944, now Patent No. 2,584,387.

As the nut 105 is drawn up on the tie rod, the V-shaped beads 101 bite into the ends of the filter elements and the tapered walls 83 of the grooves compress the ends of the exterior walls to form a double seal between the elements and the heads.

Operation

The cylinders are mounted with the separator and entered in the groove of the upper head. Thereafter the lower head is mounted on the tie rod and drawn down on the cylinders which are entered in the bottom groove. The nut is then drawn up tight and the cylinders are sealed in place.

Filtration with or without precoating is accomplished by passing liquid under differential pressure through the elements 102—104 to the channels of the separator 103. The filtrate passes through channel 79, holes 81 into chamber 77 and out the discharge stub.

To clean the surfaces of the filter elements, the flow is reversed.

The units may be readily disassembled by reversing the assembly process as is obvious.

It has been found that the units precoat evenly and to a uniform depth with filter aids, backwash readily and cleanly and also hold a precoat very successfully during idle periods or during periods of low differential pressure.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a filter unit, the combination of a pair of heads disposed in axially spaced relation, an outlet in one head, a groove in each head, said grooves being complementary, a grommet, having a U-shaped annular channel, disposed in each of said grooves, a pair of concentric filter elements, said elements being mounted with their ends in the channels of the grommets, rings disposed between said elements at the ends thereof for forcing said elements toward the adjacent walls of the grommet and away from each other to sealingly engage the grommet with said filter elements, a separator disposed between said elements and extending vertically between the rings, supporting means fixed to one of the heads, means on the supporting means adapted to coact with the other head for forcing the heads toward the ends of said elements, said grooves being formed with inwardly converging walls to urge the grommet to sealingly engage said filter elements upon operation of the forcing means, means defining passages in the head which contains the outlet, and means defining passages in the corresponding grommet, said passages serving to connect the space between the elements with said outlet.

2. In a filter unit, the combination of a pair of heads disposed in axially spaced relation, an outlet in one head, a groove in each head, said grooves being complementary, the side walls of said groove being tapered outwardly, means mounted solely on the heads for forcing the heads toward each other, a yieldable grommet in each groove having an annular channel, concentric filter elements spacedly mounted in said channels, the tapered side walls of said grooves serving to urge the grommet to laterally and sealingly engage said filter elements upon operation of the forcing means, rings disposed between said filter elements at the ends thereof to engage and hold the end portions of said elements firmly in the channels of said grommets, a separator disposed between said elements and extending between the rings, an annular channel formed in said head at the bottom of the groove, means defining passages in the head which contains the outlet, and means defining passages in the corresponding grommet, said passages and channel serving to connect the space between the elements with said outlet.

3. In a filter unit, the combination of a pair of heads disposed in axially spaced relation, an outlet in one head, a groove in each head, said grooves being complementary, the side walls of said groove being tapered outwardly, a yieldable grommet in each groove having an annular channel, concentric filter elements spacedly mounted in said channels, means defining passages in the head which contains the outlet, and means defining passages in the grommet for said head, means on the heads for forcing said heads toward each other, said tapered grooves serving to compress the grommets into sealing relation with the elements, rings disposed between said elements in radial spaced relation to each other and forcing said elements against the grommets and away from each other, a separator disposed between said elements and extending between the rings, said passages in the grommet and head forming a fluid passageway serving to connect the space between the elements with said outlet.

4. In a filter unit, the combination of a pair of heads disposed in axially spaced relation, an outlet in one head, a groove in each head, said grooves being complementary, the side walls of said groove being tapered outwardly, a yieldable grommet in each groove having an annular channel, concentric filter elements spacedly mounted in said channels, means defining passages in the head which contains the outlet, means defining passages in the grommet for said head, means on the heads for forcing said heads toward each other, said tapered grooves serving to compress the grommets into sealing relation with the elements, rings disposed between said elements in radial spaced relation to each other and forcing said elements against the grommets and away from each other, the passages in the grommet and head being adapted to connect the space between the elements with the outlet, and a corrugated separator disposed between the elements and between and in abutting relation with said rings.

5. In a filter unit, the combination of a head having an outlet, a groove in the head having side walls tapered outwardly, a yieldable grommet in the groove having an annular channel, concentric filter elements spacedly mounted in the channel, means defining passages in the head and means defining passages in the grommet for said head, means on the head for relatively forcing the filter elements and grommet axially toward each other to cause said walls to compress the grommet sealingly against the filter elements, rings disposed in said grommet for holding the end portions of said elements firmly against said grommet and in sealing engagement therewith, separator means disposed between said filter elements and extending vertically between the rings, said rings including surfaces disposed in continuous contact with the terminal areas of said elements on the sides opposite the grommet to support them against pressure from the grommet, said passages in the head, grommet and between said elements being interconnected and in communication with said outlet.

LA VERN H. DE HAVEN.

REFERENCES CITED

The following references are of record in the file of this patent:

UNITED STATES PATENTS

| Number | Name | Date |
|---|---|---|
| 651,621 | Black et al. | June 12, 1900 |
| 802,714 | Smith | Oct. 24, 1905 |
| 1,000,405 | Healy | Aug. 15, 1911 |
| 1,140,726 | Warden | Mar. 25, 1915 |
| 1,515,080 | Strachan et al. | Nov. 11, 1924 |
| 1,633,818 | Kogstrom | June 28, 1927 |
| 1,812,927 | Bull | July 7, 1931 |
| 1,836,269 | McKenzie | Dec. 15, 1931 |
| 2,061,351 | Denhard | Nov. 17, 1936 |
| 2,098,725 | Hurn | Nov. 9, 1937 |
| 2,170,074 | Hewitt | Aug. 22, 1939 |
| 2,276,118 | Taylor | Mar. 10, 1942 |
| 2,301,120 | Kamrath | Nov. 3, 1942 |

FOREIGN PATENTS

| Number | Country | Date |
|---|---|---|
| 11,700 | Great Britain | July 17, 1897 |